(12) United States Patent
Viehweg et al.

(10) Patent No.: US 8,144,606 B1
(45) Date of Patent: Mar. 27, 2012

(54) INTERFACING MESSAGES BETWEEN A HOST AND A NETWORK

(75) Inventors: Frank Viehweg, Bruschal (DE); Markus Althoff, Achern (DE); Peter Weber, Bischweier (DE)

(73) Assignee: Marvell International Ltd. (BM)

( * ) Notice: Subject to any disclaimer, the term of this patent is extended or adjusted under 35 U.S.C. 154(b) by 167 days.

(21) Appl. No.: 12/291,082

(22) Filed: Nov. 6, 2008

Related U.S. Application Data (60) Provisional application No. 60/988,274, filed on Nov. 15, 2007.

(51) Int. Cl.
*G08C 15/00* (2006.01)

(52) U.S. Cl. ........ 370/249; 370/392; 370/401; 709/224; 709/250

(58) Field of Classification Search .......... 370/221–224, 370/249, 242–245, 248, 250, 389, 392, 400–401; 375/221; 379/22.01; 398/167; 713/300; 710/22; 709/223, 224, 250
See application file for complete search history.

(56) References Cited

U.S. PATENT DOCUMENTS

| | | | | |
|---|---|---|---|---|
| 4,577,312 A * | 3/1986 | Nash | .............................. | 370/249 |
| 4,980,887 A * | 12/1990 | Dively et al. | ................. | 370/249 |
| 5,115,451 A * | 5/1992 | Furlong | ........................ | 370/249 |
| 5,339,313 A * | 8/1994 | Ben-Michael et al. | ....... | 370/249 |
| 5,390,179 A * | 2/1995 | Killian et al. | ................. | 370/249 |
| 5,398,234 A * | 3/1995 | O'Connell et al. | ........... | 370/249 |
| 5,422,876 A * | 6/1995 | Turudic | ......................... | 370/249 |
| 5,553,059 A * | 9/1996 | Emerson et al. | ............. | 370/249 |
| 5,594,927 A * | 1/1997 | Lee et al. | ......................... | 710/22 |
| 5,659,540 A * | 8/1997 | Chen et al. | .................... | 370/249 |
| 6,052,362 A * | 4/2000 | Somer | ........................... | 370/249 |
| 6,519,229 B1 * | 2/2003 | Arai et al. | ..................... | 370/249 |
| 7,082,557 B2 * | 7/2006 | Schauer et al. | ............... | 370/224 |
| 7,085,238 B2 * | 8/2006 | McBeath | ...................... | 370/249 |
| 7,093,172 B2 * | 8/2006 | Fan et al. | ..................... | 370/249 |
| 2001/0015959 A1 * | 8/2001 | Iruela et al. | .................... | 370/249 |
| 2003/0200315 A1 * | 10/2003 | Goldenberg et al. | ......... | 709/250 |
| 2005/0259589 A1 * | 11/2005 | Rozmovits et al. | ........... | 370/249 |
| 2007/0268918 A1 | 11/2007 | Gopi et al. | | |
| 2008/0002663 A1 | 1/2008 | Tripathi et al. | | |
| 2008/0016395 A1 | 1/2008 | Feng | | |
| 2008/0037444 A1 | 2/2008 | Chhabra | | |
| 2008/0263374 A1 * | 10/2008 | Shah et al. | .................... | 713/300 |

* cited by examiner

*Primary Examiner* — Jeffrey M Rutkowski

(57) ABSTRACT

Devices, systems, methods, and other embodiments associated with a network device for interfacing a host with a network are described. One example network device includes a transmit path, and a receive path. A loopback path connects the transmit path and the receive path. A frame detection logic is configured to monitor network traffic on the transmit path to identify loopback frames. When a loopback frame is detected, a loopback logic routes the identified loopback frame onto the loopback path and then to the receive path. The rerouted loopback frame may then be received by a host or an embedded client from the receive path.

32 Claims, 8 Drawing Sheets

INTERFACING MESSAGES BETWEEN A HOST AND A NETWORK

CROSS REFERENCE TO RELATED APPLICATIONS

This application claims the benefit of U.S. provisional application Ser. No. 60/988,274 filed on Nov. 15, 2007, which is hereby incorporated by reference in its entirety.

BACKGROUND

Computing devices are typically connected to a network with a network connection device. In one example, the network connection device is an Ethernet network device that connects a host to an Ethernet network. Some network connection devices contain an embedded client. To communicate with the embedded client, the host will first generate a message addressed to the embedded client. The message is then sent to the network connection device by transmitting the message into the network. The network will eventually route the message back from the network into the network connection device where the message is received by the embedded client. However, depending on the network architecture, this will not work. A more efficient and safe way of sending messages between the host and embedded client is desired.

SUMMARY

An example embodiment includes a device comprised of a transmit path and a receive path. A loopback path connects the transmit path and the receive path. The device includes a frame detection logic and a loopback logic. The frame detection logic monitors network traffic on the transmit path to identify loopback frames. The loopback logic reroutes the identified loopback frames onto the loopback path. The loopback logic then routes the frames from the loopback path to the receive path. An embedded client may then receive the frame from the receive path.

In another embodiment, the device may further include an embedded processor. The embedded processor is configured to execute an embedded client. The embedded client may be an application, firmware, code, or other software. The embedded processor is connected to the transmit path for transmitting data to a network and is connected to the receive path for receiving data from the network. The loopback logic is configured to reroute identified loopback frames on the transmit path, sent from a host, to the receive path to be received by the embedded client.

In another embodiment the loopback logic is configured to reroute identified loopback frames on the transmit path, sent from the embedded processor, to the receive path to be received by a host.

In another embodiment, the frame detection logic and the loopback logic identify and reroute loopback frames transparently to a host.

In another example embodiment, the loopback logic includes a transmit path multiplexer having an input connected to the transmit path. The transmit path multiplexer further includes a first output connected to the loopback path and a second output that continues the transmit path to the network. The example embodiment further includes a receive path multiplexer having a first input connected to receive frames from the network, a second input to receive frames from the loopback path, and an output connected to the receive path.

In one embodiment, the frame detection logic is configured to identify loopback frames by a predetermined loopback pattern and marks the identified frame with a loopback marking. The loopback logic reroutes the loopback frames that contain the loopback marking.

In one embodiment, the loopback marking is a status bit within the loopback frames.

In another embodiment, the frame detection logic detects the loopback frames by detecting a desktop and mobile architecture for system hardware (DASH) pattern within the loopback frames.

In another embodiment, the device can include a buffer and a receive path controller. The buffer is operatively connected to the receive path to store network frames received from the network. The receive path controller controls whether network frames from the buffer or network frames from the loopback path are passed to the receive path. In one example, the buffer is a first-in-first-out (FIFO) buffer. The receive path controller is, for example, a multiplexer.

In another embodiment, the device further includes a medium access controller (MAC). The medium access controller is connected to the transmit path and the receive path to control network communications between the device and the network.

Some example embodiments further include an embedded client and a multiplexer. The multiplexer is configured to control whether frames sent from the embedded client or sent from the host are passed onto the transmit path. The frame detection logic is configured to detect loopback frames transmitted by the embedded client. In some example embodiments, the embedded client is a processor for executing firmware instructions. Other example embodiments further include a buffer connected between the receive path and the embedded client. The buffer is configured to buffer a frame to be received by the embedded client from the receive path, when the embedded client is transmitting a frame to the transmit path.

In another embodiment, the loopback logic is to route the identified loopback frames onto the loopback path without the loopback frames reaching an external network.

In another embodiment, the device includes a transmit direct memory access (DMA) engine connected between the host and the transmit path. The transmit direct memory access engine is configured to control traffic on the transmit path sent from the host. A receive direct memory access engine may be connected between the receive path and the host. The receive DMA engine may be configured to control traffic on the receive path sent to the host.

In some example embodiments, the device is implemented as an integrated circuit, an application specific integrated circuit (ASIC), a network interface, an Ethernet device, and so on.

Another embodiment comprises a system for interfacing messages. The system comprises a means for identifying a loopback frame by monitoring network traffic on a transmit path where the network traffic may be sent from a host to a network. The system comprises a means for rerouting the loopback frame to a loopback path from the transmit path and then to a receive path within the network device. The message may be received by an embedded client by intercepting the loopback frame before the loopback frame reaches the network.

In another embodiment, the means for identifying comprises identifying a loopback frame by monitoring network traffic on a transmit path that was sent from the embedded client to a network. The means for rerouting identified loopback frames comprises rerouting frames sent from the embedded client, to the receive path to be received by the host.

In one embodiment, the system comprises a means for marking the loopback frame with a loopback marking to indicate the frame is a loopback frame. The means for rerouting is configured to detect the loopback marking.

In one embodiment, the loopback marking is a status bit within the loopback frame.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods and other embodiments associated with a network connection device that provides a network interface for a host device to a network. In one example, the network connection device includes an embedded client. The network connection device includes a transmit path for carrying messages transmitted from the host to the network, a receive path for receiving messages from the network, and a loopback path that connects the transmit path to the receive path. The network connection device further includes a frame detection logic configured to monitor the network traffic on the transmit path to identify messages that are addressed to the embedded client within the network connection device. A loopback logic within the network connection device is configured to intercept and divert the identified messages onto the loopback path and then to the receive path. The embedded client can then receive the looped messages from the receive path. The identification and transmission of messages from the transmit path, to the loopback path, and to the receive path is performed transparent to the host as a transparent communication.

In one embodiment, the network interface is a transparent communication interface that communicates in-band. In-band communication uses existing communication paths (e.g. a primary channel). In another embodiment, an out-of-band or side-band interface can be implemented. However for these types of interfaces, an additional alternate communication path would be implemented. It will be appreciated that with the additional path, additional testing would be performed in the device driver and in an application that communicates with the embedded processor to ensure proper operation.

In one embodiment, the transparent communication interface allows a management application (designed to communicate with the embedded firmware application) to communicate to any embedded application in the network including the network device of its own local station.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
CPU: central processing unit.
DASH: desktop and mobile architecture for system hardware.
DMA: direct memory access.
LAN: local area network.
MAC: media access controller.
PCI: peripheral component interconnect.
PCIE: PCI express.
RAM: random access memory.
RX: receive.
DRAM: dynamic RAM.
SRAM: static RAM.
ROM: read only memory.
TCP/IP: transmission control protocol/internet protocol.
TX: transmit.
PROM: programmable ROM.
EPROM: erasable PROM.
EEPROM: electrically erasable PROM.
USB: universal serial bus.
WAN: wide area network.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, integrated circuits and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

Some portions of the detailed descriptions that follow are presented in terms of algorithms and symbolic representations of operations on data bits within a memory or circuit. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Figure 1:
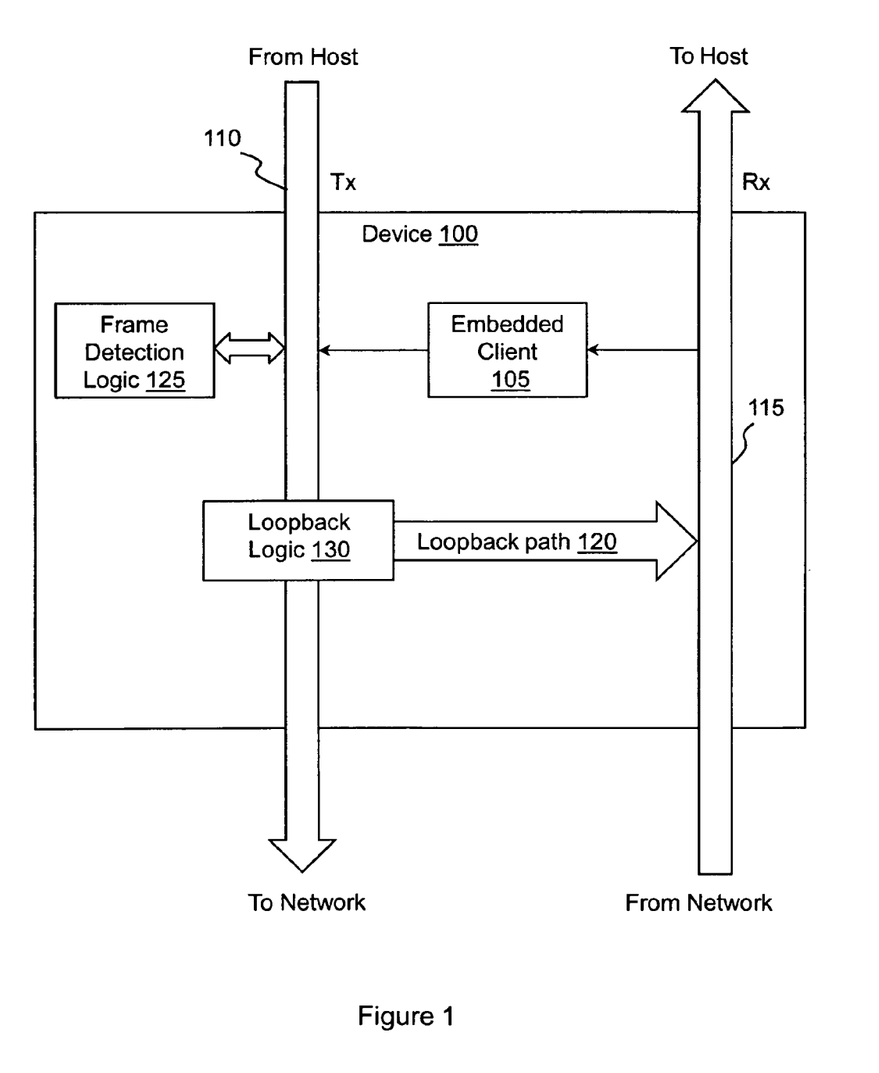
FIG. 1 illustrates one embodiment of a device associated with interfacing a host and a network.

FIG. 1 illustrates one embodiment of a network connection device 100 for providing an interface between a host and a network. The device 100 may also include an embedded client 105. In some instances, the host may wish to communicate messages to the embedded client 105 and vice versa. To the host, the embedded client 105 appears as any other destination on the network. Thus the messages would be generated as messages to be processed over the network. However, the device 100 is configured to provide a transparent interface between the host and the embedded client 105 where messages directed to the embedded client 105 from the host can be intercepted and rerouted directly (e.g. looped back) to the embedded client 105. In another embodiment, the host may intercept and reroute messages. Similarly, messages sent from the embedded client 105 to the host can be looped back to the host. In another embodiment, the messages may be looped back to the host rather than transmitting the messages out to the network where the messages would be returned to the network device 100 for receipt by the host.

In one embodiment, the device 100 may be implemented in an integrated circuit, an application specific integrated circuit (ASIC), a network interface, and so on. In another embodiment, the device 100 can be implemented as an Ethernet device that connects a host to a network. In one example, the device 100 is configured to be a component within or connected to a host machine.

With continued reference to FIG. 1, the device 100 includes a transmit path 110. The transmit path may be for carrying messages from the host to the network external to the device 100. The device 100 also includes a receive path 115. The receive path 115 may be for receiving messages from the network. A loopback path 120 connects the transmit path 110 to the receive path 115. In one embodiment, the messages may be network frames. As used within this specification, the terms message(s), frame(s), cell(s), packet(s), and network traffic are equivalent and may be used interchangeably.

The device 100 further includes a frame detection logic 125 in operable connection with the transmit path 110. The frame detection logic 125 is configured to monitor network traffic on the transmit path 110 to identify loopback frames. In one embodiment, messages addressed to the embedded client 105 include frames that are identified to be looped back within the device 100. The identified frames will be referred to herein as loopback frames.

In one example, the frame detection logic 125 is configured to identify frames that contain a predetermined data pattern that is associated with the type of embedded client 105. For example, if the embedded client 105 is configured with Desktop and mobile Architecture for System Hardware (DASH) firmware, then the frame detection logic 125 would be configured to identify DASH data patterns within the network traffic. Frames with DASH patterns would be assumed to be targeted to the embedded client 105 and thus would be loopback to the receive path 115 rather than transmitting the frames out to the network. Of course, other types of embedded clients and data patterns can be implemented. In another example, the data pattern can be an address for the embedded client that is analyzed from a frame's header. Furthermore, when a loopback frame is detected, the frame detection logic 125 can mark the loopback frame with a loopback marking. In one embodiment, the loopback marking is a status bit that is set within the frame.

The device 100 further includes a loopback logic 130. The loopback logic 130 is configured to reroute frames identified by the frame detection logic 125 as loopback frames. In one example, frames that contain a set loopback status bit would be diverted back to the receive path 115. The frames are rerouted by transmitting the frames from the transmit path 110, across the loopback path 120, and to the receive path 115. The loopback logic 130 is configured to intercept and reroute the identified frames before the frames reach the network. Thus, messages sent by the host that are destined for the embedded client are identified and looped back within the device 100 to be received by the embedded client 105. In this manner, the messages are not transmitted out to the network thus reducing time and providing the device 100 with more control in handling messages.

It will be appreciated by one of ordinary skill in the art that there may be other logic implemented between the host and the device 100 to ensure proper communication. In some embodiments, a transmission control protocol/internet protocol (TCP/IP) stack logic may be used to interface the host to a device driver. The device driver would then be configured to interface the TCP/IP stack logic to the device 100.

Figure 2:
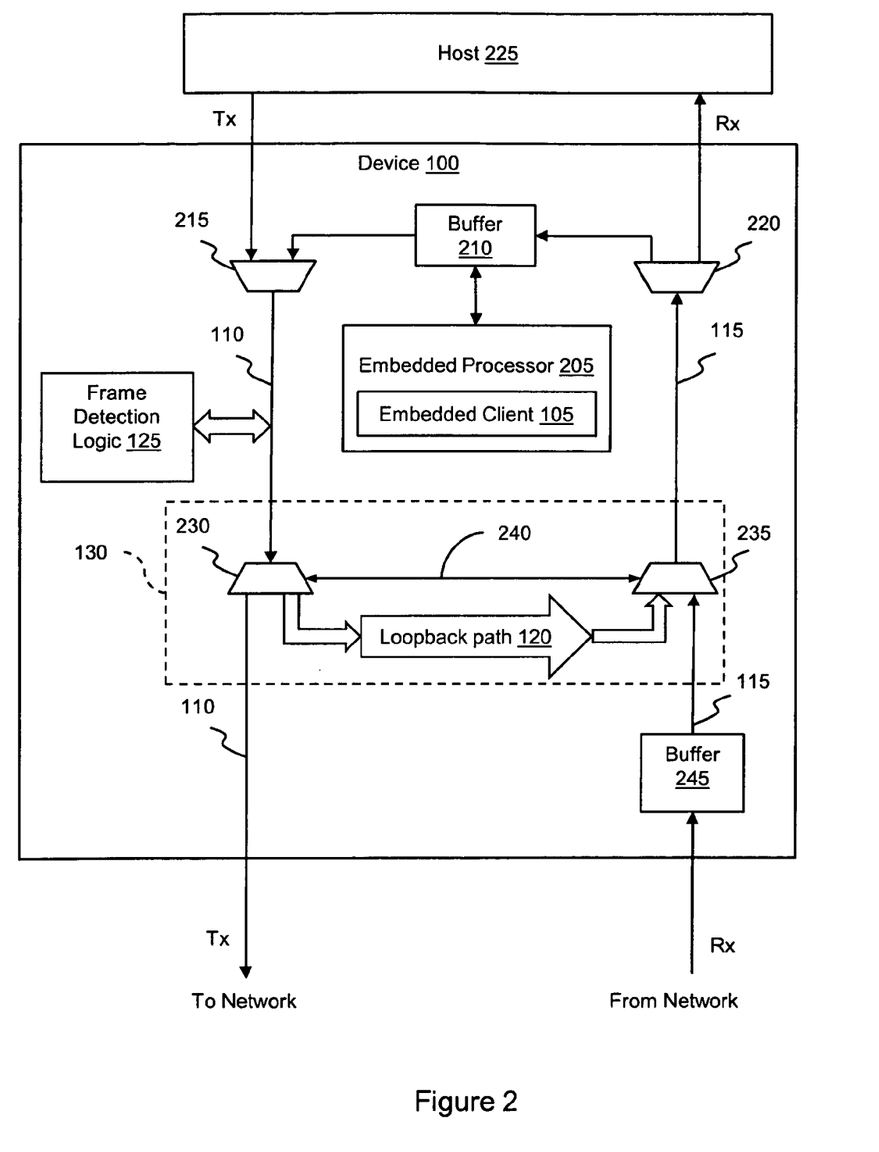
FIG. 2 illustrates another embodiment of a device associated with interfacing a host and a network.

With reference to FIG. 2, another embodiment of the device 100 is illustrated. The device 100 includes an embedded processor 205 configured to execute firmware that provides an embedded client 105. The embedded processor 205 is connected to a buffer 210. The buffer 210 is connected to the transmit path 110 and the receive path 115.

The buffer 210 is operable to buffer data sent to and from the embedded processor 205. For example, while the embedded processor 205 is transmitting data to the transmit path 110, data coming from the receive path 115 can be stored into the buffer 210 until the embedded processor 205 has completed the transmission. Likewise, when the embedded processor 205 is receiving data from the receive path 115, data transmitted by the embedded processor 205 may be stored in the buffer 210 until the embedded processor 205 has finished receiving data from the receive path 115. In another embodiment, the embedded processor 205 is directly connected to the transmit path 110 and the receive path 115 allowing the embedded processor to transmit and receive data directly without the data first passing through a buffer. In one embodiment, the embedded client 105 may be configured to receive and transmit data in parallel without CPU interaction.

The buffer 210 may be any or any combination of, volatile or non-volatile memory. In one embodiment, the buffer 210 is connected to the transmit path 110 with multiplexer 215 and to the receive path 115 with multiplexer 220.

With continued reference to FIG. 2, the transmit path (TX) 110 and the receive path (RX) 115 of the device 100 are configured for connection to corresponding communication paths in a host device 225. As previously stated, in one embodiment, the device 100 is a network device or chip within the host device 225 for providing network communication, or can be part of an externally connected network device.

As discussed above, the device 100 is configured to provide an interface between the host 225 and the embedded client 105. The interface is transparent to the host 225 (or host application) because the host application does not need to change how is generates or transmits messages directed to the embedded client 105. Rather, the device 110 is configured to identify messages directed to the embedded client 105 and reroute the messages internally referred to as looping back.

Also as previously described, the frame detection logic 125 is configured to monitor network traffic on the transmit path 110 to identify frames that may be looped back within the device 100. The loopback logic 130 then reroutes the identified frames from the transmit path 110 to the receive path 115 for receipt by the embedded client 105. Likewise, the loopback logic 130 is configured to reroute identified loopback frames on the transmit path 110, sent from the embedded processor 205, to the receive path 115 to be received by the host 225. In another embodiment, the frame detection logic 125 and the loopback logic 130 identify and reroute loopback frames transparent to the host 225, TCP/IP logic and device drivers as discussed above. Thus, alternatively, messages sent by the host 225 in this embodiment, may be directly routed to the embedded client 105. In another embodiment, the routing prevents the messages from being transmitted out to the network.

In one embodiment, the loopback logic 130 includes the loopback path 120, a transmit path multiplexer 230 and a receive path multiplexer 235. The transmit path multiplexer 230 has an input connected to the transmit path 110, a first output connected to the loopback path 120, and a second output that continues the transmit path 110 to the network. The receive path multiplexer 235 has a first input connected to receive data from the network via the receive path 115 and a second input connected to receive data from the loopback path 120. The output of the receive path multiplexer 235 is connected to continue the receive path 115.

In another embodiment, the loopback logic 130 can also include a control signal 240 is used to control the transmit path multiplexer 230 and the receive path multiplexer 235. For example, the control signal 240 may correspond to a bit within a frame set by the frame detection logic 125 that marks the frame as a loopback frame. For example, if the control signal 240 is high, then the output of the transmit path multiplexer 230 is transmitted to the loopback path 120. Also, when the control signal 240 is high, the loopback path input to the receive path multiplexer 235 is selected to be transmitted to the output of the receive path multiplexer 235. When the control signal 240 is low, the transmit path input of the transmit path multiplexer 230 is connected to the output of multiplexer 230 to continue the transmit path 110 out to the network. When the control signal 240 is low, the output of a receive buffer 245 is connected to the receive path multiplexer 235 to pass the received data from the network along the receive path 115.

The receive buffer 245 is operatively connected to the receive path 115 to buffer network frames received from the network. The receive buffer 245 is, for example, a first-in-first-out (FIFO) buffer. The receive path multiplexer 235 can function as a receive path controller that controls whether frames from the receive buffer 245 or frames from the loopback path 120 are passed to the receive path 115. The receive path controller may also be implemented in other arrangements. Also, a controller can be provided to control the operation of the multiplexer 220 so as to control whether a loopback frame is redirected to the buffer 210 or if the frame is not a loopback frame, then continued along the receive path 115 to the host 225.

Figure 3:
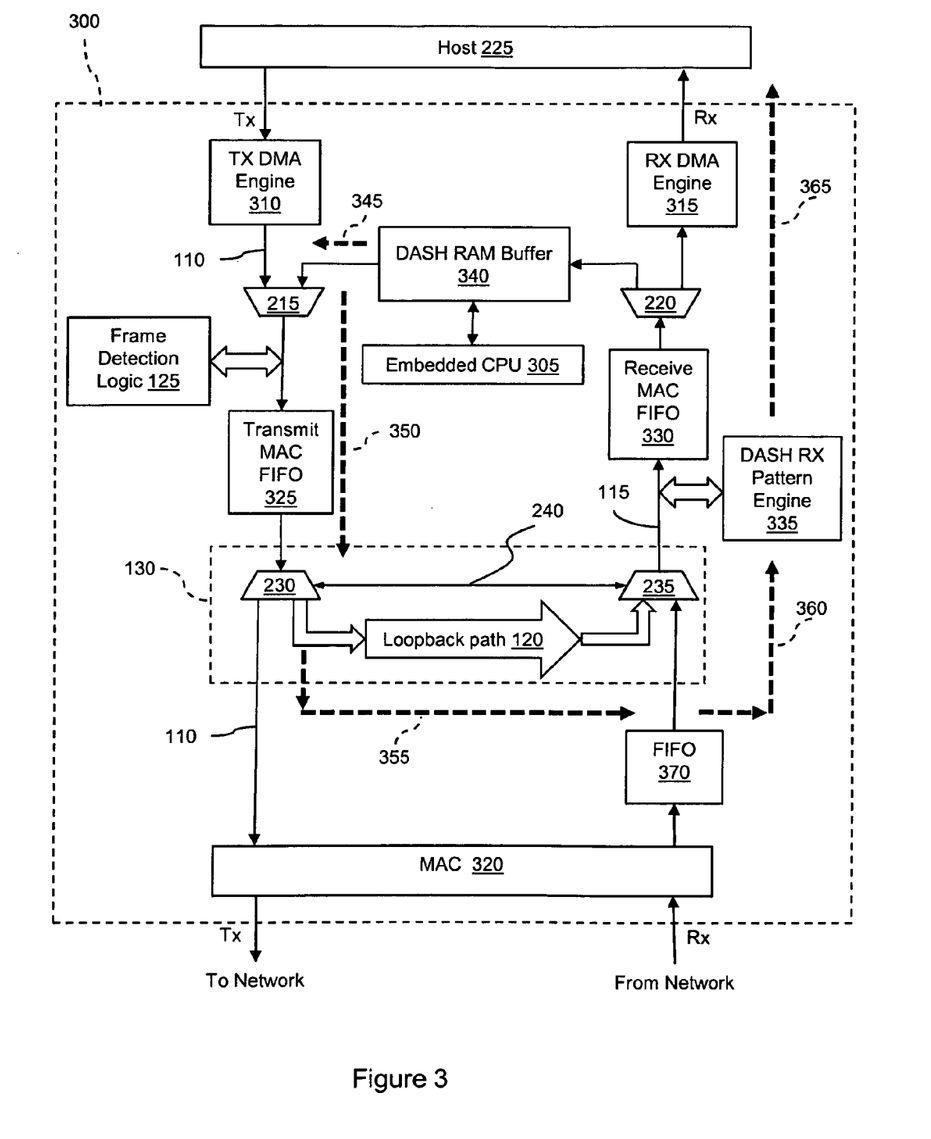
FIG. 3 illustrates one embodiment of a system associated with interfacing a host and a network.
Figure 4:
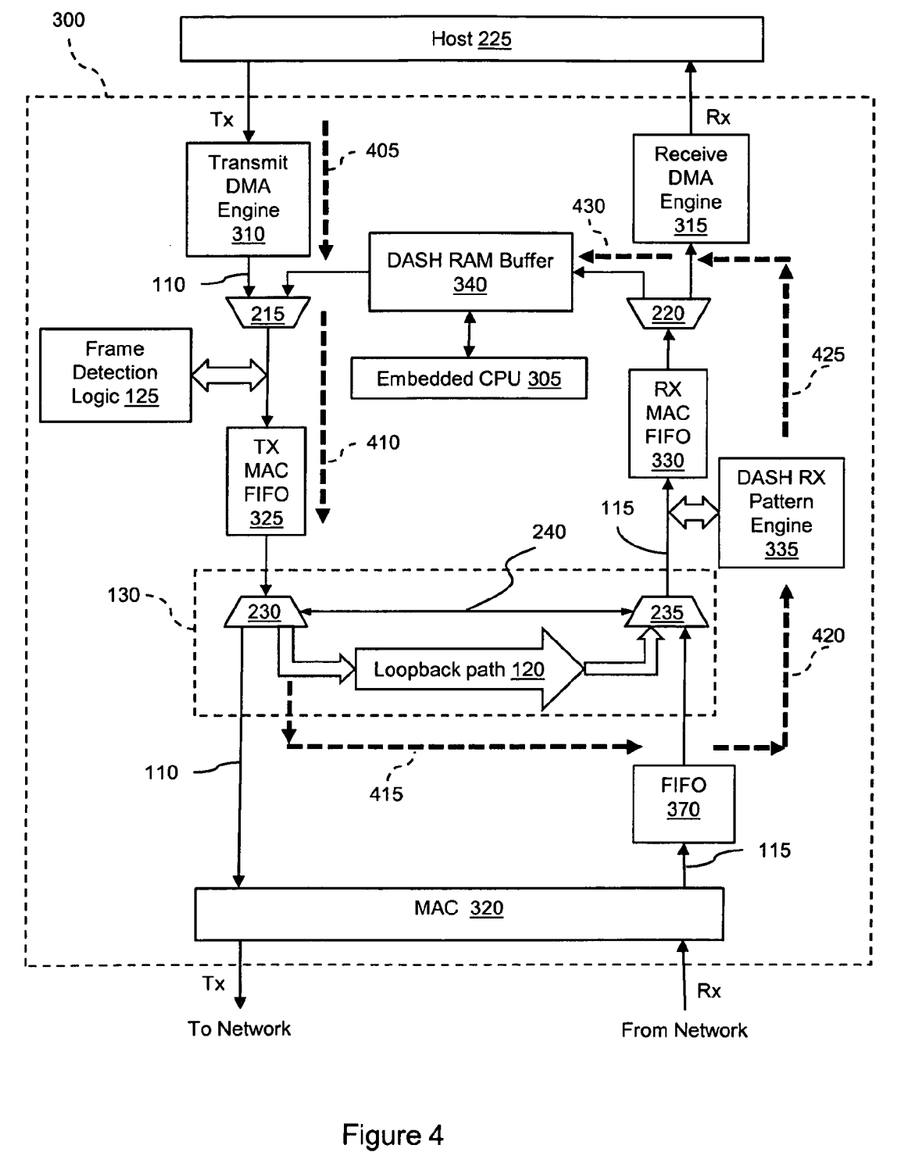
FIG. 4 illustrates another embodiment of a system associated with interfacing a host and a network.

FIG. 3 illustrates one embodiment of a system 300 for interfacing a host device 225 with a network. The system 300 is a modified embodiment of the device 100 shown in FIG. 2 and includes an embedded central processing unit (CPU) 305. The embedded CPU 305 will be regarded as the embedded client although firmware executing within the CPU 305 may be the actual client. FIG. 3 further illustrates an example transmission path for messages sent out of the embedded CPU 305 that are to be delivered the host 225. The transmission path is shown as a group of bold dashed arrow lines that will be used to explain the operation of the system 300. FIG. 4 illustrates an example transmission path for messages sent by the host that are to be delivered to the embedded CPU 305.

With reference to FIG. 3, the system 300 includes a transmit (TX) direct memory access (DMA) engine 310 connected between the host 225 and the transmit path 110. A receive (RX) direct memory access (DMA) engine 315 is connected between the receive path 115 and the host 225. The transmit DMA engine 310 is configured to control network traffic coming from the host 225 to the system 300. The receive DMA engine 315 is configured to control network traffic from the system 300 to the host 225. On the other side, the system 300 can include a medium access controller (MAC) 320, which functions as an interface between the Logical Link Control (LLC) sublayer and the network's physical layer.

The system 300 may also include a transmit (TX) MAC FIFO 325 and a receive (RX) MAC FIFO 330. The TX MAC FIFO 325 is inserted in the transmit path 110 between multiplexer 215 and transmit path multiplexer 230. The RX MAC FIFO 330 is inserted between the multiplexer 220 and the receive path multiplexer 235. The TX MAC FIFO 325 and the RX MAC FIFO 330 are used to buffer data on the transmit path 110 and the receive path 115, respectively. In one embodiment, a FIFO buffer 370 may buffer the data received from the network before the data is sent to the receive path 115 via the multiplexer 235.

In one embodiment, the system 300 is configured as an Ethernet device with DASH firmware as previously explained. Thus the embedded client in this embodiment is a DASH-based client and the system 300 is configured to identify DASH data patterns in order to loopback appropriate frames. Of course, other types of clients and/or data patterns can be used. In the DASH embodiment, the system 300 can include a DASH RX pattern engine 335. The DASH RX pattern engine 335 monitors the network traffic on the receive path 115 to identify frames that are to be routed to the embedded CPU 305 or if not, then routed to the host 225. The routing is controlled by selecting the appropriate output path of the multiplexer 220. A DASH RAM buffer 340 is operative to receive frames from the receive path 115 via the multiplexer 220 and transmit frames to the transmit path 110 via multiplexer 215.

Additionally, FIG. 3 shows an example path of how frames are processed where the frames are sent from the embedded CPU 305 and are intended for the host 225. As previously explained these frames are identified and looped back within the system 300 and then out to the host 225. Thus the frames avoid being transmitted and processed through the external network.

First, the frame is sent from the embedded CPU 305 to the DASH RAM buffer 340, where the frame is buffered until the transmit path 110 is available. When the transmit path 110 is available, the frame is sent along path 345, through multiplexer 215 as indicated by path 350. The frame may be partially stored in the TX MAC FIFO 325 depending on the transmission speeds of the DASH RAM buffer 340 and the operating speed of the transmit path 110. The frame detection logic 125 is configured to identify frames from the embedded CPU (in this case, frames having a DASH data pattern and intended for the host) and marks the frame as being a loopback frame. As the frame proceeds on the transmit path 110, the loopback logic 130 detects that the frame is to be looped back rather than proceeding to the network. If the frame is to be looped back, then the frame is transmitted through the transmit path multiplexer 230 to the loopback path 120 as indicated by path 355. As shown by path 360, the frame proceeds along the receive path 115 to the multiplexer 220. Since the frame is not intended for the embedded CPU 305, the multiplexer 220 is controlled to continue the frame along the receive path to the receive DMA engine 315 and out to the host 225.

FIG. 4 shows an example path of how a frame is sent from the host 225 to the embedded CPU 305. All other components are the same as in FIG. 3. Here, the host 225 will first generate a message intended for the embedded CPU/client 305. Frames are sent for transmission to the network and into network system 300. The frame is sent along path 405 through the transmit DMA engine 310 to multiplexer 215 along the transmit path 110. The frame detection logic 125 identifies the frame as being intended for the embedded CPU/client 305 and marks the frame for loopback. The frame proceeds along path 410 to where the loopback logic 130 detects that the frame is a loopback frame and controls the multiplexer 230 to redirect the frame from the transmit path 110 to the receive path 115 via the loopback path 120 (shown as paths 415 and 420).

The DASH RX pattern engine 335 then detects that the frame is addressed to the embedded CPU 305 and controls the multiplexer 220 to route the frame to the embedded CPU 305 via the DASH RAM buffer 340 (shown as paths 425 and 430).

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
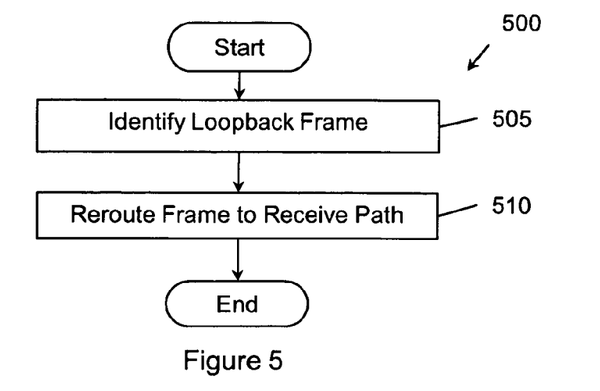
FIG. 5 illustrates one embodiment of a method associated with interfacing a host and a network.

FIG. 5 illustrates one embodiment of a method 500 for transferring network frames. The method 500 may be associated with interfacing messages between a host and a network, where the host includes a network device having an embedded client as previously described. At block 505, the method begins by identifying frames to be looped back. The frames may have been transmitted from the host to the embedded client. The loopback frame can be identified by scanning network traffic to detect a selected data pattern associated with the embedded client. In one embodiment, the data pattern is based on a desktop and mobile architecture for system hardware (DASH) loopback pattern.

The method continues, at 510, by rerouting the identified frame. The identified frame may be rerouted from the transmit path to a receive path within the network device, for example via a loopback path. The loopback frame is then received by the embedded client from the receive path. Thus frames are intercepted and rerouted within the network device before the frame reaches the network. The method 500 may be performed, at least partially, within an integrated circuit, an application specific integrated circuit, a network interface, and so on.

Figure 6:
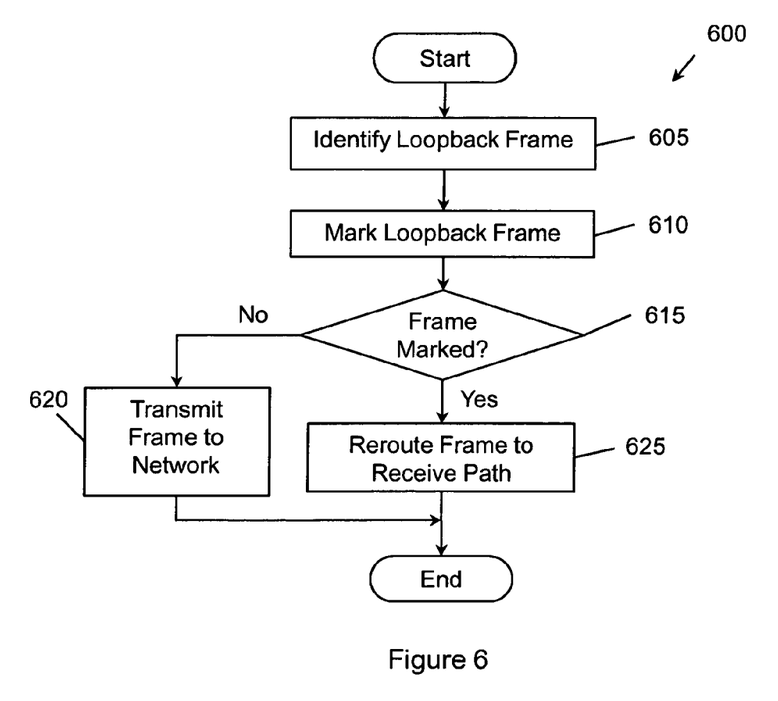
FIG. 6 illustrates another embodiment of a method associated with interfacing a host and a network.

FIG. 6 illustrates another embodiment of a method associated with interfacing messages between a host, an embedded client, and a network. The method begins, at 605, by identifying a loopback frame as discussed above. At 610, the identified frame is marked with a loopback marking to indicate the frame is a loopback frame. For example, the loopback frame may be marked by writing a status bit within the frame. Next, at 615, a determination is made to determine if the frame was marked. When a frame has not been marked as a loopback frame, the frame is transmitted to the network at block 620. If the frame has been marked as a loopback frame, the frame is rerouted to the receive path based on the loopback marking (block 625). The rerouting, at 625, may include transferring frames between the transmit path and the loopback path. The frames may then be transferred between the loopback path and the receive path.

In other embodiments, the identified loopback frame may be sent by the embedded client to the transmit path destined for the network. If the frame is address to the host, the frame may be identified as discussed above and rerouted back to the receive path to be received by the host. In the method 600, the loopback frames may be identified and looped back transparently to the embedded client and host.

In another embodiment, the method 600 may include buffering a network frame received on the receive path. Buffering allows a different frame to be received from the network while a frame identified as a loopback frame is being looped back to the receive path.

Figure 7:
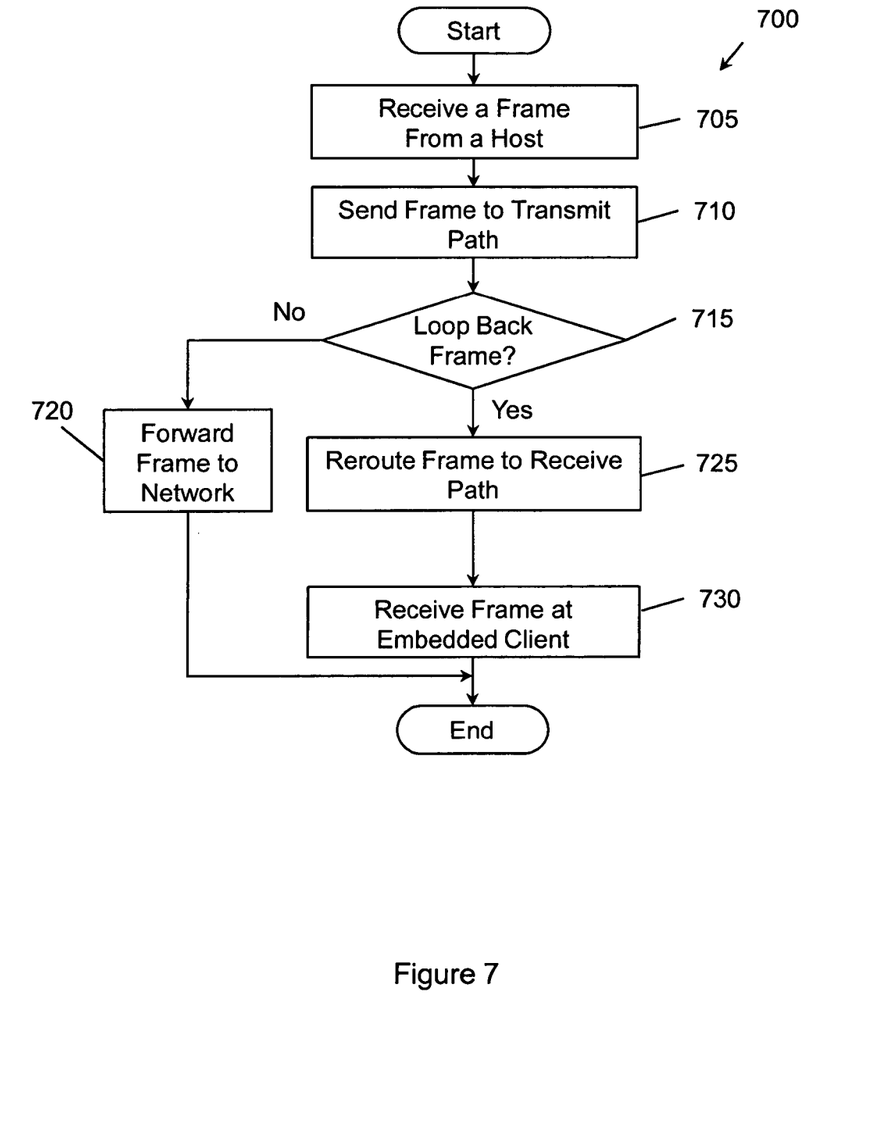
FIG. 7 illustrates another embodiment of a method associated with interfacing a host and a network.

FIG. 7 illustrates another embodiment of a method 700 associated with interfacing messages between a host, an embedded client, and a network. The method 700 begins, at 705, by receiving a frame that was generated and sent by a host. At 710, the frame is sent to a transmit path to be forwarded to a network. Next, at 715, a determination is made as to whether the frame should be looped back before reaching the network. Methods of how to determine if a frame should be looped back were discussed above. The frame is forwarded to the network, at 720, if the frame is not identified as a frame that should be looped back. If the frame should be looped back, the frame is rerouted to a receive path, at 725. The frame can then be received by the embedded client (at 730).

Figure 8:
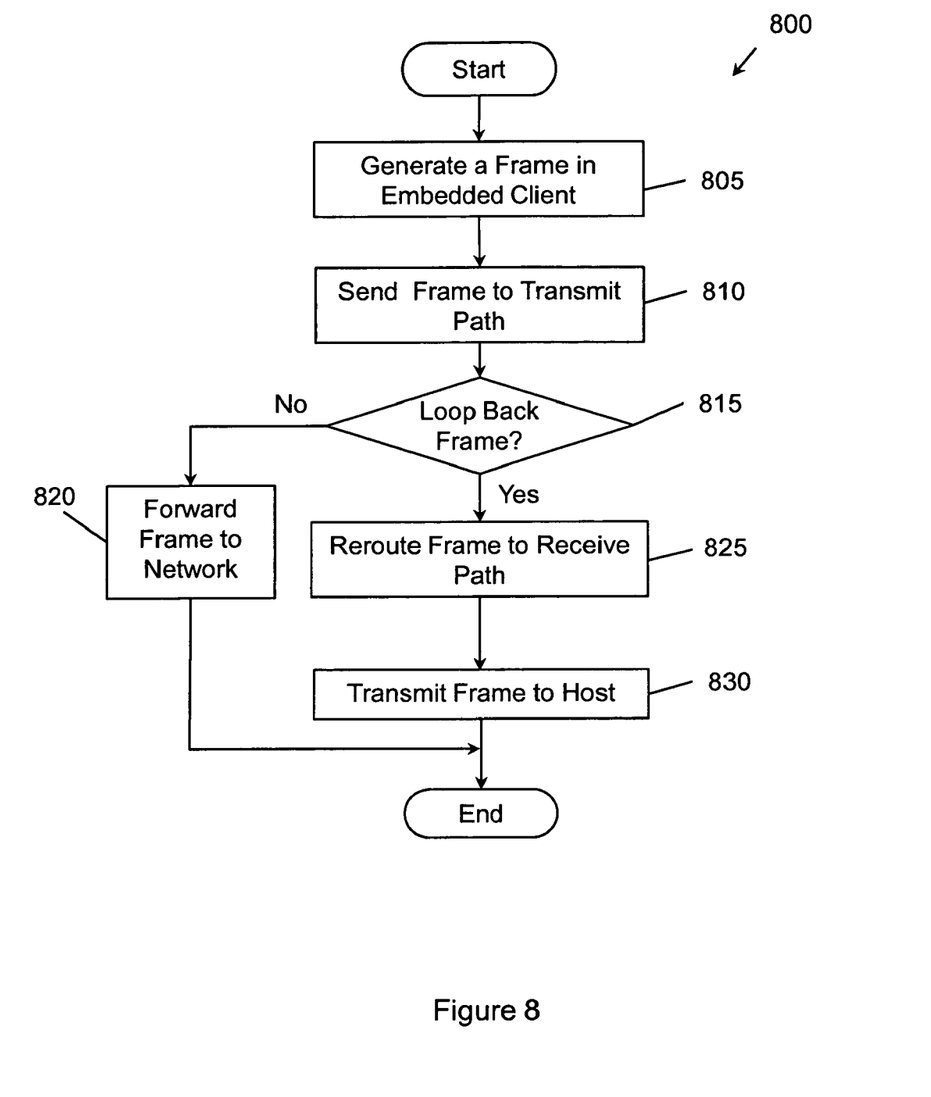
FIG. 8 illustrates another embodiment of a method associated with interfacing a host and a network.

FIG. 8 illustrates another embodiment of a method 800 associated with interfacing messages between a host, an embedded client, and a network. The method 800 begins, at 805, by generating a frame in the embedded client that is intended for the host. At 810, the frame is sent to a transmit path to be forwarded to a network. Next, at 815, a determination is made as to whether the frame should be looped back before reaching the network. The frame is forwarded to the network, at 820 if the frame's destination is not the host. If the frame should be looped back, the frame is rerouted to a receive path, at 825. The frame then is transmitted directly to the host (block 830).

In one example, a method may be implemented as computer executable instructions. Thus, in one example, a computer-readable medium may store computer executable instructions that if executed by a machine (e.g., processor) cause the machine to perform a method that includes determining if frames may be looped back and rerouting those frames before those frames enter a network. While executable instructions associated with the above method are described as being stored on a computer-readable medium, it is to be appreciated that executable instructions associated with other example methods described herein may also be stored on a computer-readable medium.

Figure 9:
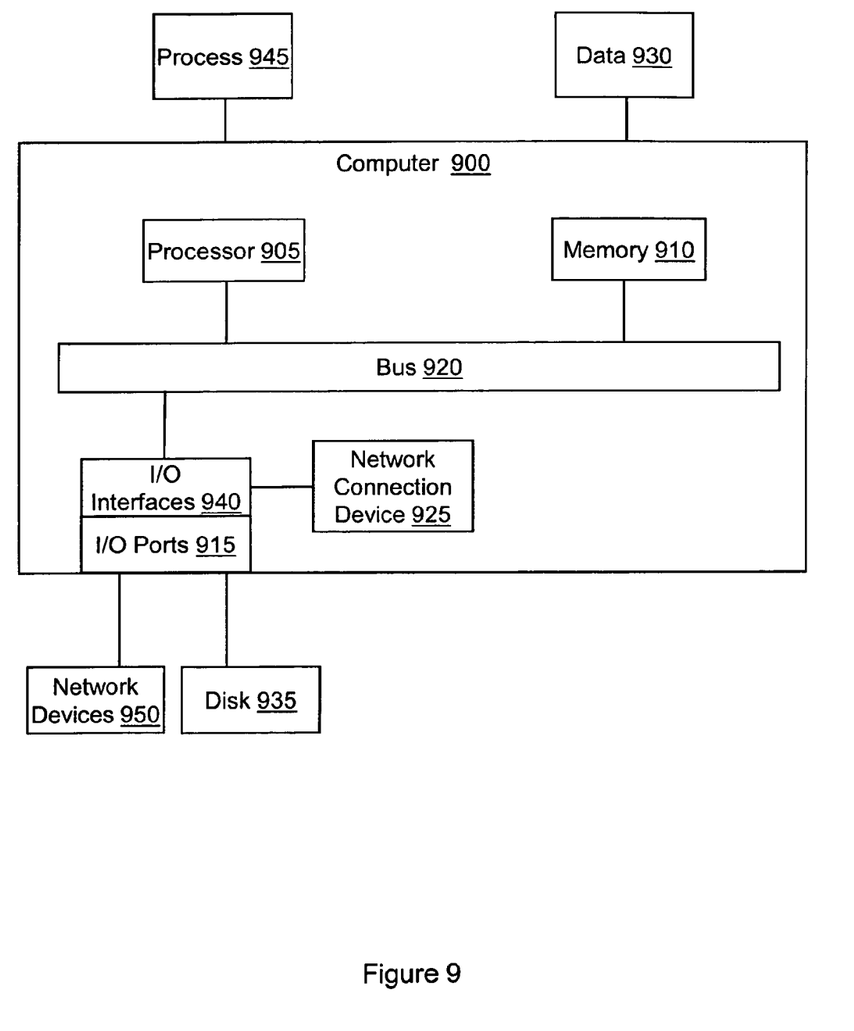
FIG. 9 illustrates one embodiment of a computing environment in which example systems and methods, and equivalents for interfacing a host and a network may operate.

FIG. 9 illustrates an example computing device in which example systems and methods described herein, and equivalents, may operate. The example computing device may be a computer 900 that includes a processor 905, a memory 910, and input/output ports 915 operably connected by a bus 920. In one example, the computer 900 may include a network connection device 925 configured to facilitate determining if frames should be looped back and rerouting those frames before the frames enter the network. The network connection device 925 is implemented as the device 100 (of FIG. 1 or 2), the system 300 (of FIG. 3 or 4), or combinations and equivalents thereof. In different examples, the network connection device 925 may be implemented in hardware, software, firmware, and/or combinations thereof.

In some example embodiments, the network connection device 925 may assist a packet processor (not shown). For example, in a packet processing architecture a message may be received and the message header information analyzed. Received messages may be stored in the memory 910 where the message waits to be processed if resources to process the message are not available. Based on information within the header, the message may be given a transmission priority. Messages with a high priority may be withdrawn from the memory before lower priority message, as resources to forward messages become available. In some embodiments, a message with a high priority may first be checked by the network connection device 925 to see if the message is to be rerouted using currently available resources, without needing to store the message in the memory 910.

Thus, the network connection device 925 provides a means (e.g., hardware, stored software, firmware) for identifying frames that are originally routed toward a network, but that may be identified as frames to be looped back before reaching the network. The frames are scanned to determine if a selected data pattern associated with the embedded client or host is present in the frame. The pattern is used to identify the frame as a loopback frame that is then looped back to the receive path. Thus the network connection device 925 provides a means of looping the identified frame back toward the destination of the frame without the frame entering the network.

The means may be implemented, for example, as an ASIC or other type of circuit configured to detect loopback frames as illustrated in the present figures. The means may also be implemented as computer executable instructions that are stored and processed by a processor.

Generally describing an example configuration of the computer 900, the processor 905 may be a variety of various processors including dual microprocessor and other multi-processor architectures. A memory 910 may include volatile memory and/or non-volatile memory. Non-volatile memory may include, for example, ROM, PROM, and so on. Volatile memory may include, for example, RAM, SRAM, DRAM, and so on.

A disk 935 may be operably connected to the computer 900 via, for example, an input/output interface (e.g., card, device) 940 and the input/output port 915. The disk 935 may be, for example, a magnetic disk drive, a solid state disk drive, a floppy disk drive, a tape drive, a Zip drive, a flash memory card, a memory stick, and so on. Furthermore, the disk 935 may be a CD-ROM drive, a CD-R drive, a CD-RW drive, a DVD ROM, and so on. The memory 910 can store a process 945 and/or a data 930, for example. The disk 935 and/or the memory 910 can store an operating system that controls and allocates resources of the computer 900.

The bus 920 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 920 can be types including, for example, a memory bus, a memory controller, a peripheral bus, an external bus, a crossbar switch, and/or a local bus.

The computer 900 may interact with input/output devices via the i/o interfaces 940 including the network connection device 925 and the input/output ports 915. Input/output devices may be, for example, a keyboard, a microphone, a pointing and selection device, cameras, video cards, displays, the disk 935, the network devices 950, and so on. The input/output ports 915 may include, for example, serial ports, parallel ports, and USB ports.

The computer 900 can operate in a network environment and thus may be connected to the network devices 950 via the i/o interfaces 940, and/or the I/O ports 915. Through the network devices 950, the computer 900 may interact with a network. Through the network, the computer 900 may be logically connected to remote computers. Networks with which the computer 900 may interact include, but are not limited to, a LAN, a WAN, and other networks.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A device, comprising:
   a transmit path;
   a receive path;
   wherein the transmit path and the receive path are configured to provide, at least in part, network connectivity for a host device to a network;
   a loopback path connecting the transmit path and the receive path;
   an embedded processor within the device configured to execute an embedded client, wherein the embedded processor is connected to the transmit path for transmitting data to the network and is connected to the receive path for receiving data from the network;
   a frame detection logic configured to monitor network traffic on the transmit path to identify loopback frames which include frames addressed to the embedded client; and
   a loopback logic configured to reroute the identified loopback frames sent from the host device and addressed to the embedded client onto the loopback path and then to the receive path destined for the embedded client without the loopback frames being transmitted back to the host device.

2. The device of claim 1, wherein the loopback frames include frames that are addressed to the host device, and wherein the loopback logic is configured to reroute identified loopback frames addressed to the host device on the transmit path, sent from the embedded processor, to the receive path to be received by the host device.

3. The device of claim 1, where the frame detection logic and the loopback logic identify and reroute loopback frames transparently to the host device.

4. The device claim 1, where the loopback logic includes:
   a transmit path multiplexer having an input connected to the transmit path and having a first output connected to the loopback path and a second output that continues the transmit path to the network; and
   a receive path multiplexer having a first input connected to receive frames from the network and a second input to receive frames from the loopback path, and having an output connected to the receive path.

5. The device of claim 1, where the frame detection logic is configured to identify loopback frames by a predetermined data pattern, and configured to mark the loopback frames with a loopback marking; and
   where the loopback logic reroutes loopback frames that contain the loopback marking.

6. The device of claim 5, where the loopback marking is a status bit within the loopback frames.

7. The device of claim 1, where the frame detection logic detects the loopback frames by detecting a desktop and mobile architecture for system hardware (DASH) pattern within the loopback frames.

8. The device of claim 1, further including:
   a buffer to store network frames received from a network; and
   a receive path controller to control whether the network frames from the buffer or network frames from the loopback path are passed to the receive path.

9. The device of claim 1, where the device is an Ethernet device to provide network connectivity for the host device.

10. The device of claim 8, where the receive path controller is a multiplexer.

11. The device of claim 1, further including:
    a medium access controller (MAC) connected to the transmit path and the receive path to control network communications between the device and a network.

12. The device of claim 1, further including:
    a multiplexer configured to control whether frames sent from an embedded client within the device or sent from a host are passed onto the transmit path.

13. The device of claim 1, where the device includes an embedded client that is a processor for executing firmware instructions.

14. The device of claim 1, further including a buffer connected between the receive path and an embedded client within the device, where the buffer is configured to buffer a frame to be received by the embedded client from the receive path when the embedded client is transmitting a frame to the transmit path.

15. The device of claim 1, where the frame detection logic is configured to identify the loopback frames that are sent from the host device and have a destination within an embedded component within the network without the loopback frames reaching the network.

16. The device of claim 1, further including:
    a transmit direct memory access (DMA) engine connected between a host and the transmit path and configured to control traffic on the transmit path from the host; and
    a receive direct memory access engine connected between the receive path and the host, and configured to control traffic on the receive path to the host.

17. The device of claim 1, where the device is: an integrated circuit, an application specific integrated circuit (ASIC), a network interface, or an Ethernet device.

18. A method for transferring network frames, the method comprising:
    identifying loopback frames by monitoring network traffic on a transmit path within a network device that provides network connectivity for a host to a network, wherein the network device includes an embedded client and the loopback frames are frames that are addressed to the embedded client; and
    re-routing the identified loopback frames sent from the host and addressed to the embedded client from the transmit path to a receive path within the network device wherein the loopback frames are destined at the embedded client without the loopback frames being transmitted back to the host.

19. The method of claim 18, where the loopback frames are identified and rerouted transparently to the host.

20. The method of claim 18, further including:
marking the identified frames with a loopback marking to indicate the frames are loopback frames; and
where rerouting the loopbacks frames occurs based on the loopback marking.

21. The method of claim 20, where the loopback frames are marked by writing a status bit within the loopback frames.

22. The method of claim 18, where the identified frames are identified by scanning network traffic to detect a desktop and mobile architecture for system hardware (DASH) pattern within the frames.

23. The method of claim 18, where the identifying includes identifying a predetermined data pattern within a frame where the predetermined data pattern is associated with a type of an embedded client that is embedded in the network device.

24. The method of claim 18, where the identifying includes identifying a predetermined data pattern within a frame where the predetermined data pattern is associated with the host as being a destination of the frame.

25. The method of claim 18, further including:
transferring frames between the transmit path and the loopback path; and
transferring frames between the loopback path and the receive path.

26. The method of claim 18, further including:
transmitting frames from an embedded client within the network device;
routing the frames transmitted by the embedded client onto the transmit path; and where the identifying the loopback frames includes identifying loopback frames transmitted by the embedded client and addressed to the host.

27. The method of claim 18, further including buffering a frame to be received by an embedded client from the receive path while a different frame is being transmitted to the transmit path by the embedded client.

28. The method of claim 18, further including identifying loopback frames as frames sent from an embedded client to the host where the embedded client is embedded in the network device.

29. The method of claim 18, including identifying loopback frames transmitted from the host and destined for an embedded client, where the embedded client is embedded in the network device.

30. The method of claim 18, including re-routing loopback frames to be received by an embedded client.

31. The method of claim 18, where identifying the loopback frames is performed in an Ethernet device connects the host to the network.

32. The method of claim 18, further comprising:
transferring network frames between the host and an embedded client within the network device, where the network device provides network communication between the host and the network;
where identifying loopback frames monitors the network traffic transmitted from the host and is destined for the embedded client; and
intercepting the identified loopback frames from the transmit path before the re-routing, the intercepted loopback frames being re-routed to the receive path before the loopback frames reach the network.

* * * * *